(12) United States Patent
Thibault et al.

(10) Patent No.: US 8,119,912 B2
(45) Date of Patent: Feb. 21, 2012

(54) COVER ASSEMBLY FOR AN IN-FLOOR BOX

(75) Inventors: Steven C. Thibault, Harwinton, CT (US); Joseph A. Milheiro, West Hartford, CT (US); Peter Currier, Winsted, CT (US); Jean-Luc Godard, West Granby, CT (US)

(73) Assignee: The Wiremold Company, West Hartford, CT (US)

( * ) Notice: Subject to any disclaimer, the term of this patent is extended or adjusted under 35 U.S.C. 154(b) by 421 days.

(21) Appl. No.: 12/395,799

(22) Filed: Mar. 2, 2009

(65) Prior Publication Data

US 2009/0159308 A1 Jun. 25, 2009

Related U.S. Application Data

(63) Continuation-in-part of application No. 11/897,056, filed on Aug. 28, 2007.

(60) Provisional application No. 61/033,161, filed on Mar. 3, 2008, provisional application No. 60/840,911, filed on Aug. 29, 2006.

(51) Int. Cl.
*H02G 3/14* (2006.01)
*H05K 5/03* (2006.01)

(52) U.S. Cl. ............ 174/67; 174/66; 174/482; 174/488; 220/3.2; 220/241; 220/242

(58) Field of Classification Search .................. 174/480, 174/482–488, 490, 502, 50, 53, 57, 58, 520, 174/66, 67, 152 G, 500, 135; 220/3.2–3.9, 220/4.02, 241, 242; 439/535, 536, 137
See application file for complete search history.

(56) References Cited

U.S. PATENT DOCUMENTS

| | | | | |
|---|---|---|---|---|
| 4,640,564 A * | 2/1987 | Hill | | 439/137 |
| 4,688,491 A * | 8/1987 | Herrera et al. | | 174/152 G |
| 4,721,476 A * | 1/1988 | Zeliff et al. | | 439/536 |
| 5,167,047 A * | 12/1992 | Plumley | | 174/500 |
| 5,727,958 A * | 3/1998 | Chen | | 174/67 |
| 7,459,632 B2 * | 12/2008 | Bowman | | 174/66 |
| 7,476,803 B2 * | 1/2009 | Dinh | | 174/50 |
| 7,795,544 B2 * | 9/2010 | Peck | | 174/482 |
| 7,935,898 B2 * | 5/2011 | Jolly | | 174/482 |
| 2003/0109172 A1 * | 6/2003 | Foden et al. | | 439/535 |

* cited by examiner

*Primary Examiner* — Angel R Estrada
(74) *Attorney, Agent, or Firm* — McCormick, Paulding & Huber LLP

(57) ABSTRACT

A cover assembly for a floor-mounted enclosure or in-floor box includes a lid that remains flush with the floor and covers the in-floor box while permitting egress of electrical cables connected to receptacles housed in the box.

17 Claims, 6 Drawing Sheets

COVER ASSEMBLY FOR AN IN-FLOOR BOX

CROSS REFERENCE TO RELATED APPLICATIONS

The present application is a continuation-in-part of, claims priority to, and hereby incorporates herein by reference in its entirety U.S. patent application Ser. No. 11/897,056, filed Aug. 28, 2007. The present application also claims priority to, and hereby incorporates herein by reference in their entireties, Provisional Application Ser. No. 61/033,161, filed Mar. 3, 2008 and Provisional Application Ser. No. 60/840,911, filed Aug. 29, 2006.

FIELD OF THE INVENTION

The present invention relates primarily to electrical fittings and, more particularly, to recessed in-floor electrical boxes.

BACKGROUND OF THE INVENTION

Often, large buildings such as convention centers, exhibition centers, arenas and other facilities provide utility services at certain locations throughout a floor of the facility. Typically, source power and signal cables are loosely positioned in a plenum under the floor. The source cables can be pulled from the plenum and connected with or passed through an in-floor box. More specifically, high voltage source power cables are connected with power receptacles that may be mounted within the in-floor box. Lower voltage communication/data signal cables also can be connected to communication/data receptacles mounted within the in-floor box.

Floors require periodic cleaning including vacuuming, sweeping, mopping, and/or polishing. Particularly during such cleaning, the in-floor box provides a ready receptacle for debris, detritus, and liquids. Even during normal traffic across the floor, the in-floor box presents a low point where spilled liquids and dropped litter naturally tend to collect. Although the in-floor box can be covered to prevent entrance of liquids and debris, covering the in-floor box typically is not effective while above-floor cables are connected to the receptacles within the in-floor box. Even if the in-floor box is covered with cables connected, the cover is known to protrude above floor level, presenting a trip hazard.

Accordingly, there is a need for an apparatus that will prevent or mitigate entry of liquids and debris into an in-floor box while cables are connected to receptacles housed within the in-floor box. Additionally, there is a desire for an apparatus that can cover an in-floor box and permit egress of cables from the in-floor box while reducing a hazard of tripping.

BRIEF SUMMARY OF THE INVENTION

According to the present invention, a floor-mounted enclosure or in-floor box is provided with a lid that remains flush with the floor and covers the in-floor box while permitting egress of electrical cables from connectors received by receptacles housed in the in-floor box.

According to an embodiment of the present invention, a cover for an in-floor box includes a lid and a door. The lid has a cutout for receiving a cable attached to a connector. The door is movably connected to the lid for opening or closing the cutout. The door remains generally below an upward surface of the lid when the lid is closed to cover the in-floor box, whether the cutout is opened or closed. The door can be slidably connected to the lid. The door can be spring-biased to close the cutout. The lid can include a track, and the door can include a key slidingly engaged in the track. The track can be formed in an underside of the lid. The cover can also include a bar fastened to the lid for securing the door against the lid. The securing bar can act as a drip edge adjacent to the cutout. The securing bar can include a notch, and the door can include a tab so that the door can be held in a fully open position by latching the tab into the notch. The cover can also include a flange to which the lid is pivotally connected. Closing the lid against the flange can disengage the door tab from the securing bar notch, causing the spring to close the door.

According to an embodiment of the present invention, a cover for a floor mounted enclosure includes a lid and a door. The lid has a cutout for receiving a cable attached to a connector. The door is movably connected to the lid for opening or closing the cutout. The door is pivotally connected to the lid, and can nest into a recess indented into an upper surface of the lid.

According to an embodiment of the present invention, a cover for a floor mounted enclosure includes a lid and a door. The lid has a cutout for receiving a cable attached to a connector. The door is elastically deformable or flexible for permitting cable egress from the enclosure through the cutout when the lid is closed or installed on the enclosure. While cables pass through the cutout, the flexible door remains generally below an upper surface of the lid, such that no trip hazard is presented by the lid or the door.

DETAILED DESCRIPTION OF PREFERRED EMBODIMENTS

Figure 1:
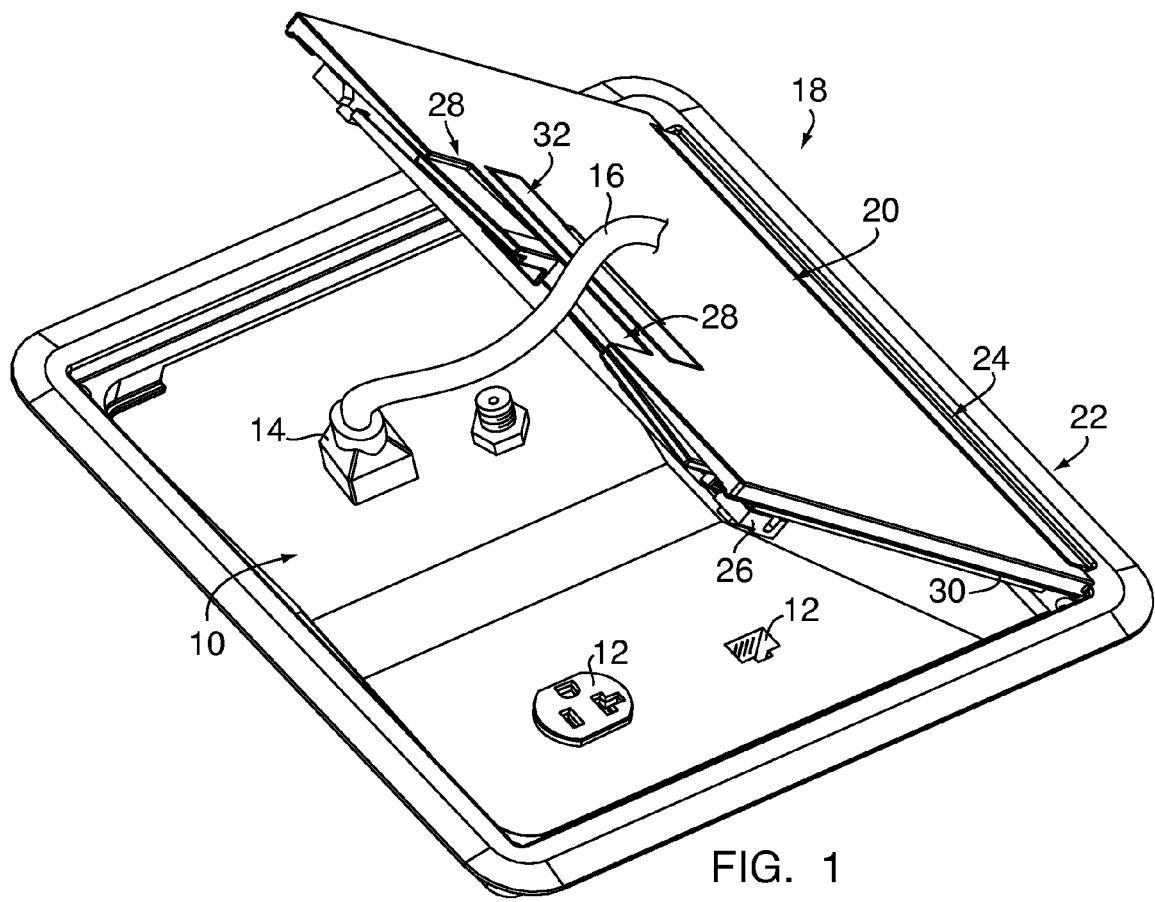
FIG. 1 is a perspective view of an in-floor box and a cover assembly having a sliding door, according to an embodiment of the present invention.

Referring to FIG. 1, an in-floor enclosure or electrical box 10 houses outlets or receptacles 12 for accepting connectors or plugs 14 of one or more conduits or cables 16 carrying electrical power or voice, data, and other communication signals. A cover assembly 18 is attached to the in-floor box 10. The cover assembly 18 includes a lid 20, a flange 22, and a hinge 24 connecting the lid 20 to the flange 22 in a pivoting and articulating manner. The cover assembly 18 also includes a securing bar 26 fastened to the lid 20, sliding doors 28 movably engaged between the lid 20 and the securing bar 26, a gasket 30 disposed between the lid 20 and the flange 22, and a pivoting handle 32 attached to the securing bar 26 for moving the lid 20 about the hinge 24.

Figure 2:
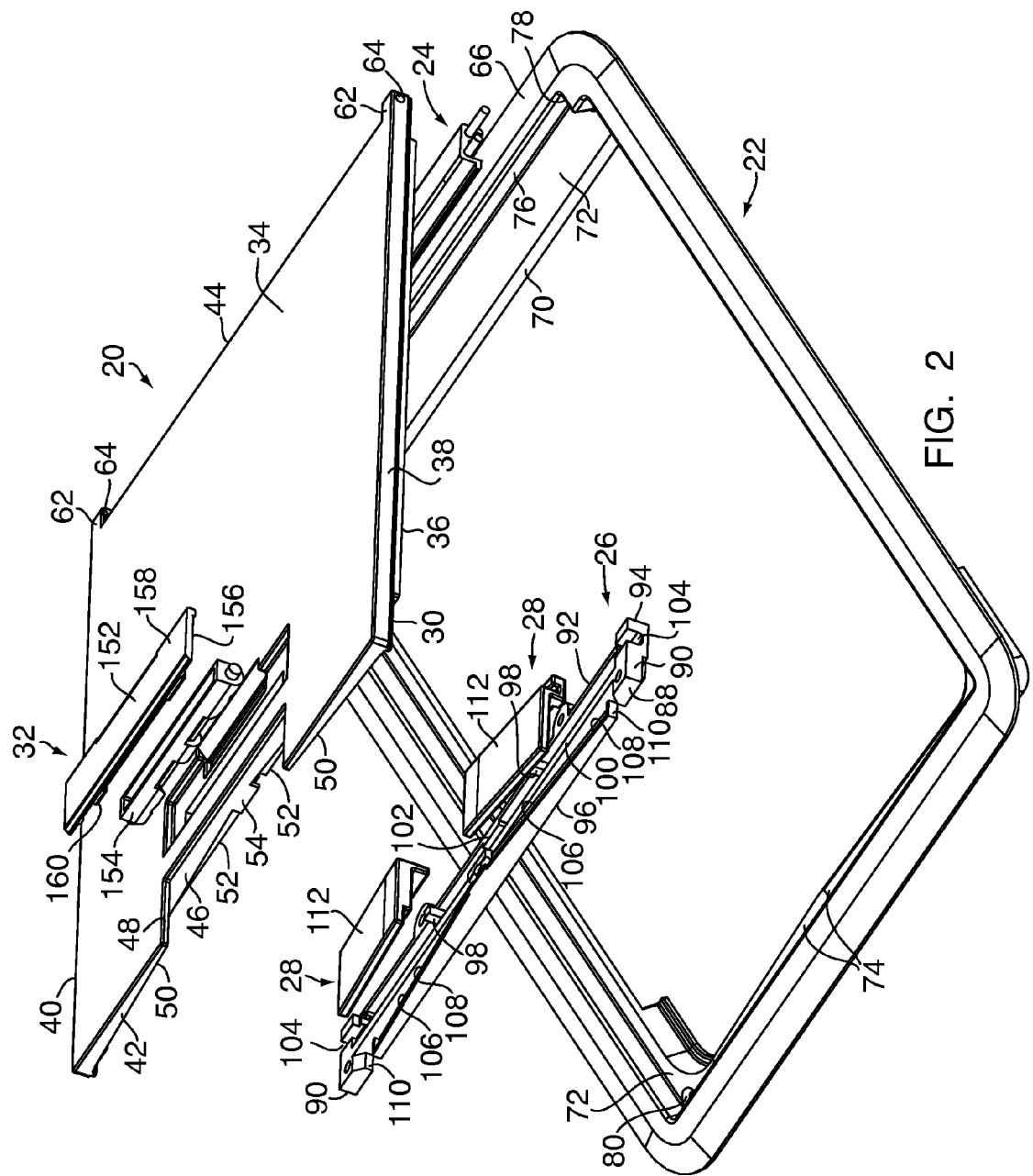
FIG. 2 is a first exploded assembly view of the cover assembly of FIG. 1.
Figure 3:
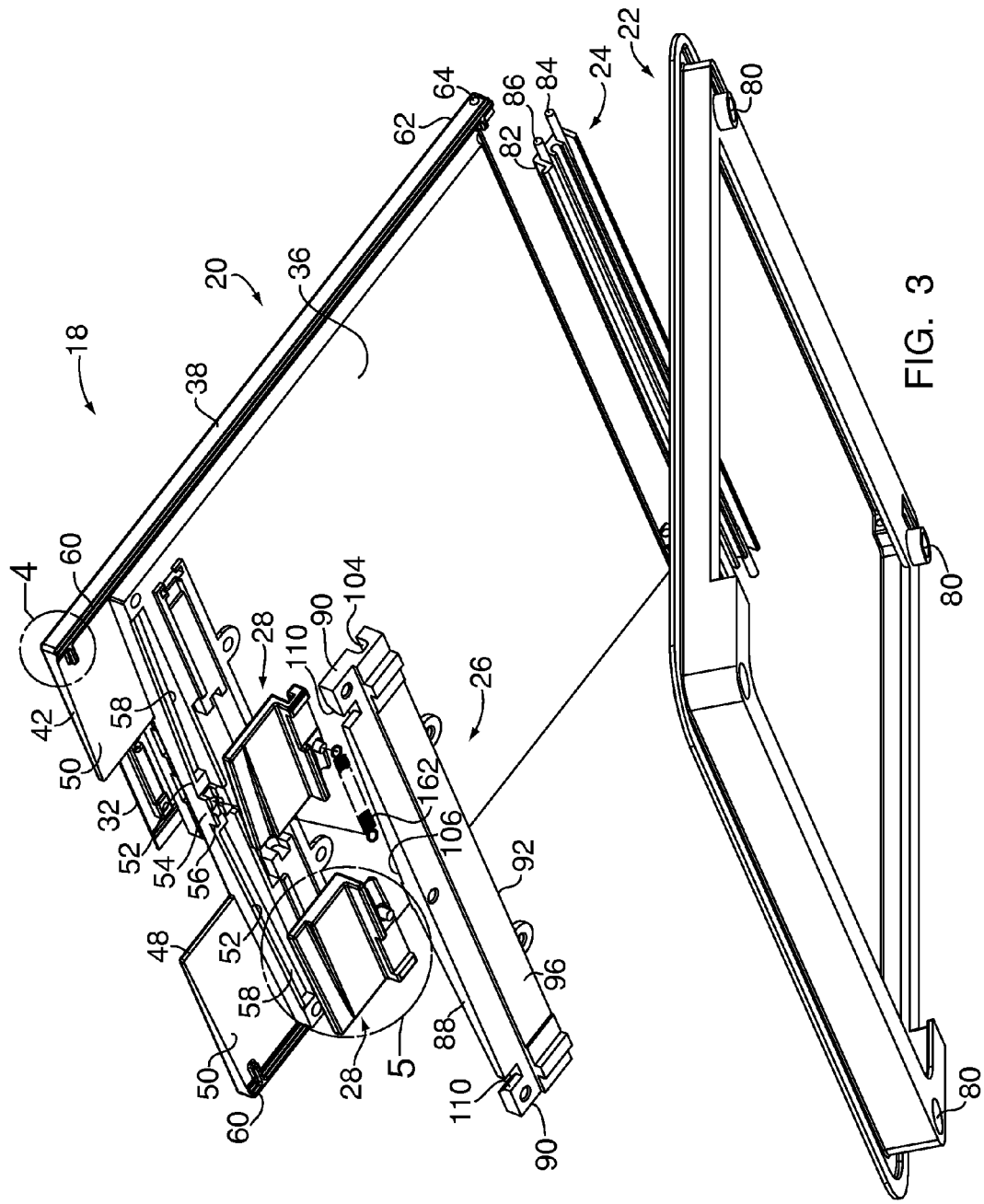
FIG. 3 is a second exploded assembly view of the cover assembly of FIG. 1.
Figure 4:
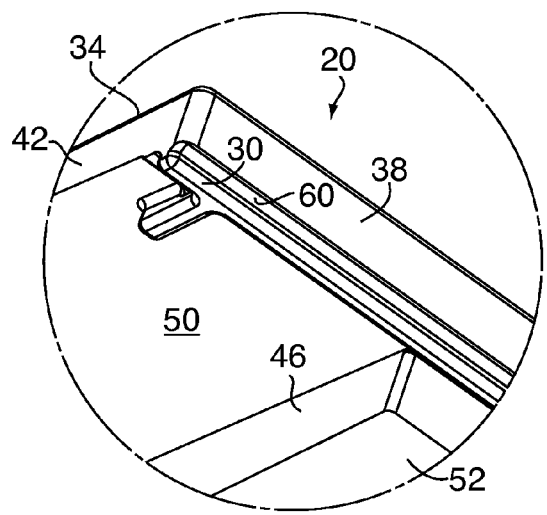
FIG. 4 is a detailed view of a gasket in the cover assembly of FIG. 3.

Referring to FIGS. 2 through 4, the lid 20 has an outer face 34 and an inner face 36 joined by lateral faces 38, 40, a forward face 42, and a rearward face 44. The outer face 34 faces upward, and the inner face 36 faces downward, when the lid 20 is in a closed position relative to the flange 22. The outer face 34 and the inner face 36 form a cutout 48 extending rearward from the forward face 42. The inner face 36 includes a shoulder 46 adjacent to the cutout 48. The inner face 36 also includes sloping surfaces 50 extending from the cutout 48 to the lateral faces 38, 40.

As best shown in FIG. 3, the inner face 36 also includes inclined portions 52 adjacent to the shoulder 46. The inclined portions 52 include grooved tracks 58 indented into the inner face 36 substantially parallel to the shoulder 46. The inner face 36 also includes a spring block 54 disposed between the inclined portions 52. The spring block 54 includes a hole 56 formed therein for attaching a door spring 162.

As best shown in FIG. 4, the lateral faces 38, 40 include lips 60 that extend outward adjacent to the outer face 34 to receive the gasket 30. The gasket 30 is dimensioned to fit between the lid 20 and the flange 22 so as to prevent entrance of liquids or debris from above the lid 20. The gasket 30 can be attached to the lips 60 of the lid 20, or to the flange 22. Dimensions of the gasket 30 can be determined based on the material from which the gasket 30 is fabricated. The gasket 30 can be made from any suitable material. Suitable materials include hydrophilic or hydrophobic polymers, resins, natural or artificial fibers, foams, and similar materials.

Referring back to FIGS. 2 and 3, the rearward face 44 includes extensions 62 that protrude rearward adjacent to the lateral faces 38, 40. Each extension 62 has a pin hole 64 formed therein for connecting the lid 20 to the hinge 24. The articulating hinge 24 includes an elongated hinge bar 82 that houses a flange pin 84 and a lid pin 86. The lid pin 86 is received in the pin holes 64 of the lid 20. The flange pin 84 is received by the flange 22.

The flange 22 includes a floor skirt 66, a wall 70, and a tray 72. The tray 72 includes ramps 74 formed at a forward side of the flange 22, and a hinge box 76 indented into the wall 70 at a rearward side of the flange 22. The hinge box 76 has pin slots 78 indented into the wall 70 at each end of the hinge box 76 for receiving the flange pin 84 of the hinge 24. The tray 72 also includes mounting holes 80 for attaching the flange 22 to the in-floor box 10.

The securing bar 26 includes a front face 88, end faces 90, a rearward face 92, a lidward face 94, and a boxward face 96. The lidward face 94 has posts 98, a midline wall 100, and a rearward wall 102 protruding therefrom. The lidward face 94 also has a latch channel 104 indented inward from each of the end faces 90, and has inclined portions 106 formed adjacent to the front face 88. The inclined portions 106 slope outward from a midline of the lidward face 94 toward the boxward face 96. Each inclined portion 106 includes a groove 108 and a notch 110 formed through the securing bar 26 at an outer end of the groove 108.

Figure 5:
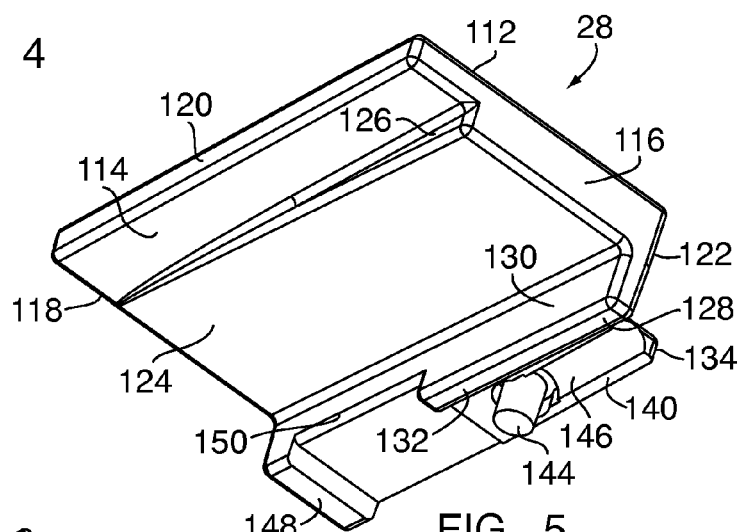
FIG. 5 is a detailed view of a sliding door in the cover assembly of FIG. 3.
Figure 6:
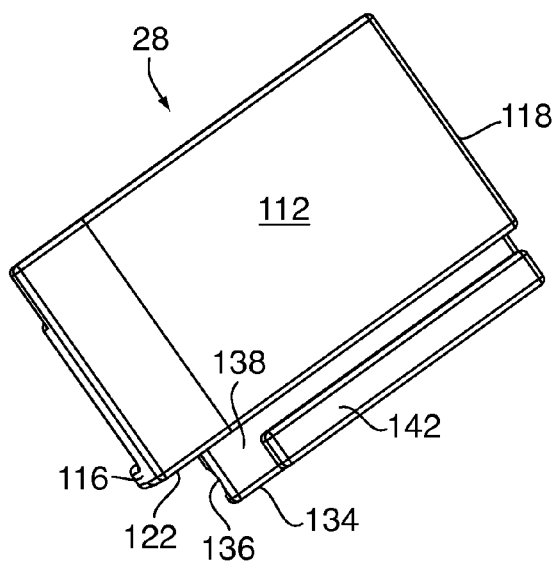
FIG. 6 is a rotated view of the sliding door of FIG. 5.

Referring to FIGS. 5 and 6, each sliding door 28 has a first surface 112, a lifting surface 114, an inward surface 116, an outward surface 118, a forward surface 120, a rearward surface 122, and a sloping surface 124. The first surface 112 and the sloping surface 124 taper toward each other from the inward surface 116 toward the outward surface 118. The sloping surface 124 is offset from the lifting surface 114 by an intermediate shoulder 126.

The rearward surface 122 extends from the first surface 112 beyond the sloping surface 124 to define a rear shoulder 128. The rear shoulder 128 extends from the inward surface 116 to the outward surface 118. The rearward surface 122 also includes a ledge 134 that extends from the outward surface 118 to an inward end 136 offset outward from the inward surface 116. The ledge 134 has a lid side 138 and a box side 140. The ledge lid side 138 includes a key 142 formed thereon, which protrudes substantially parallel to the rearward surface 122. The ledge box side 140 includes a spring post 144 and a spring groove 146. The spring groove 146 extends from the ledge inward end 136 around the spring post 144.

The door 28 also includes a tab 148 formed adjacent to the outward surface 118. The tab 148 extends rearward from the rear shoulder 128 across the box side 140 of the ledge 134. The rear shoulder 128 includes a divot 150 formed inward from the tab 148.

Referring back to FIG. 2, the pivoting handle 32 includes a finger grip 152 and an axle 154. The finger grip 152 has a lidward side 156 and a roomward side 158. Posts 160 protrude from the lidward side 156 of the finger grip 152. The axle 154 is attached to the finger grip 152 by way of the posts 160.

Referring to FIGS. 2 and 3, each door 28 is assembled to the lid 20 by engaging the key 142 of the door 28 in one of the tracks 58. One end of the door spring 162 (as shown in FIG. 3) is fastened to the lid 20 by means of a post or screw (not shown) inserted through the hole 56 formed in the spring block 54. The other end of the door spring 162 is fastened to the spring post 144, and the door spring 162 is partially housed in the spring groove 146. The rearward surface 122 of the door 28 abuts against the shoulder 46 of the lid 20. The securing bar 26 is fastened to the lid 20 with the securing bar grooves 108 aligned to the lid tracks 58. Each door spring 162 is received by, and moves within, the corresponding groove 108. The rearward surface 122 of each door 28 abuts against the front face 88 of the securing bar 26. The ledge 134 of each door 28 rides between the corresponding inclined portion 52 of the lid 20 and the corresponding inclined portion 106 of the securing bar 26. Additionally, the securing bar 26 can act as a drip edge adjacent to the cutout 48. The pivoting handle 32 is attached to the securing bar 26, the axle 154 of the pivoting handle being rotatably engaged by the posts 98, the midline wall 100, and the rearward wall 102. A spring detent or sliding latch (not shown), for releasably securing the securing bar 26 and the lid 20 to the flange 22, can be housed in each of the latch channels 104. Optionally, the sliding latch can be operated by motion of the pivoting handle 32. The lid 20 is assembled to the flange 22 by way of the articulating hinge 24 so that each ramp 74 is registered with the lifting surface 114 of a corresponding door 28. The flange 22 is attached to the in-floor box 10. Preferably, none of the outlets 12 is located below the cutout 48.

In operation, the handle 32 is lifted and the lid 20 is moved to an open position. The articulating hinge 24 permits the lid, when fully opened, to rest flat against the floor in which the in-floor box 10 is mounted. With the lid 20 in any open position, the door 28 is moved so that the first surface 112 of the door 28 slides along the adjacent sloping surface 50 of the lid 20 to provide an opening through the cutout 48. The divot 150 formed in the rear shoulder 128 provides clearance to allow the tab 148 to engage into the notch 110. When the lid 20 and the door 28 both are opened, the door tab 148 latches into the notch 110 formed at the outer end of the securing bar inclined portion 106, thereby holding the door 28 open against the door spring 162 to permit placement of the cable or cables 16 through the cutout 48.

The lid 20 is closed to cover the in-floor box. With the lid 20 in the closed position, the lifting surface 114 of the door 28 contacts the ramp 74 of the flange 22, bumping the tab 148 out of the notch 110 and releasing the door 28 so that the spring 162 moves the door 28 to abut against the cables 16 passing through the cutout 48. Thus, the door 28 minimizes entrance of liquid or debris into the in-floor box 10 while permitting egress of cables 16 from the in-floor box 10. The door 28 does not protrude above the outer face 34 of the lid 20. Also, the handle 32 rests against the securing bar lidward face 94 so that the roomward side 158 of the handle 32 is substantially coplanar with the outer face 34 of the lid 20. Thus, the lid 20, the door 28, and the handle 32 permit egress of cables from the in-floor box 10 while reducing a hazard of tripping.

Figure 7:
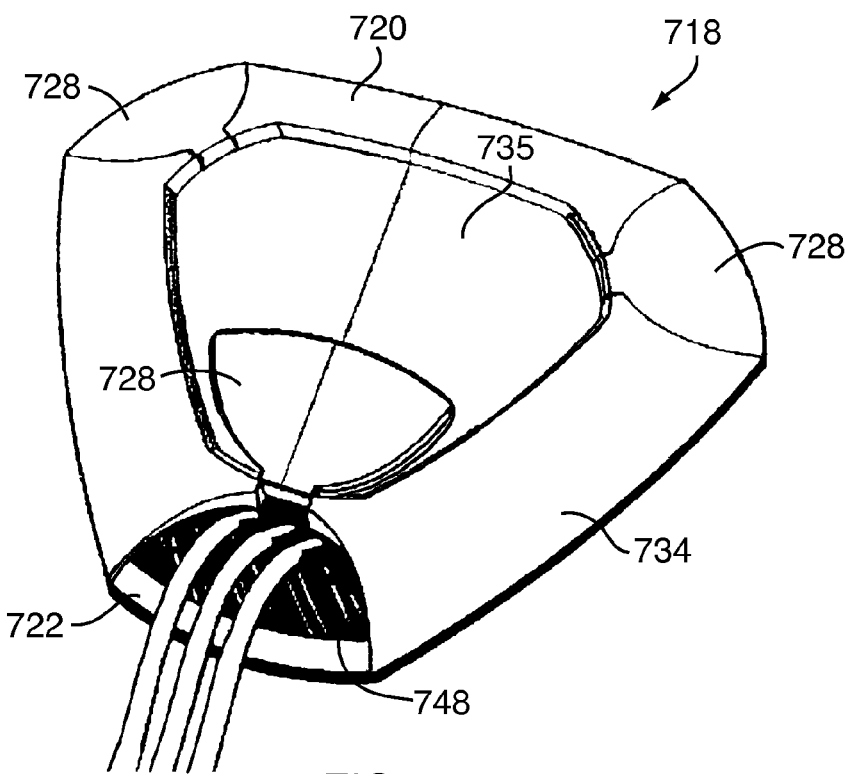
FIG. 7 is a perspective view of a cover assembly having a pivoting door, according to another embodiment of the present invention.

In the embodiment shown in FIG. 7, like numbers refer to like elements. A cover assembly 718 for an electrical in-floor box includes a lid 720 that is pivotally movable, relative to a flange 722, between a closed position and an open position permitting access to receptacles housed within the in-floor box. The lid 720 includes a cutout 748 formed therein. The lid 720 also includes a door 728 that is pivotally movable relative to the lid 720 so as to open or close the cutout 748. In operation, the lid 720 is moved to the open position and one or more cables are connected to the receptacles within the in-floor box. The door 728 is moved so that an upper surface thereof nests into a recess 735 indented into a first face 734 of the lid 720. The recess 735 is disposed substantially lower than the first face 734. The first face 734 is substantially flush with a floor in which the in-floor box is installed. Accordingly, when the lid 720 is returned to the closed position, the door 728 does not protrude above the floor. However, the cutout 748 permits egress of the cables through the lid 720.

Figure 8:
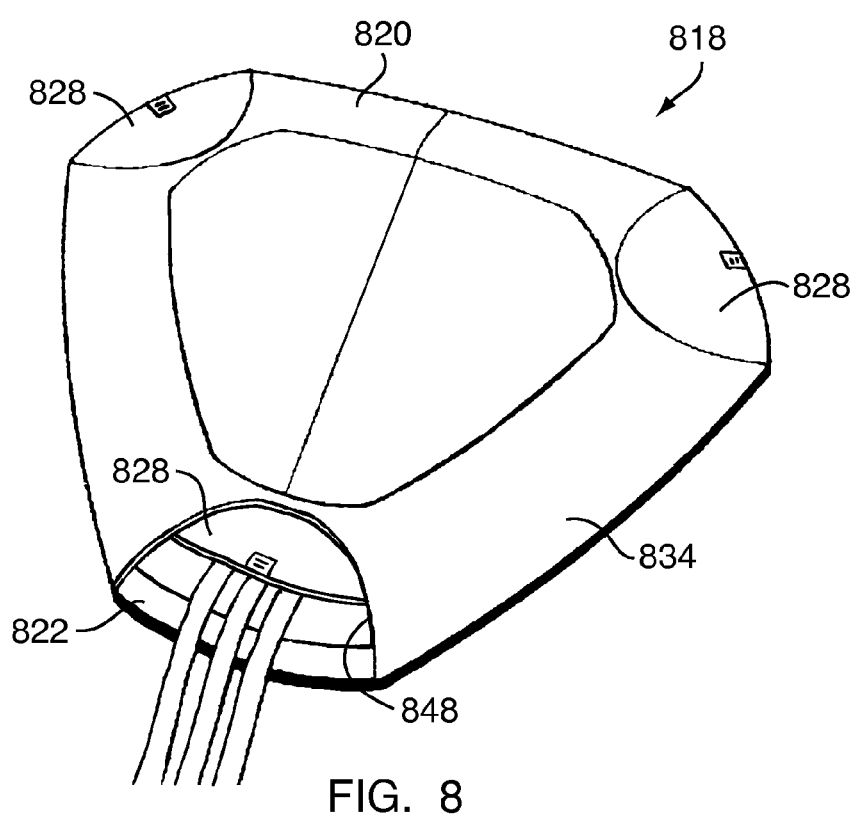
FIG. 8 is a perspective view of a cover assembly having a sliding door, according to another embodiment of the present invention.

In the embodiment shown in FIG. 8, a cover assembly 818 for an electrical in-floor box includes a lid 820 that is pivotally movable, relative to a flange 822, between a closed position and an open position permitting access to receptacles housed within the in-floor box. The lid 820 includes a cutout 848 formed therein, or at a periphery thereof. The lid 820 also includes a door 828 that is slidingly movable relative to the lid 820 so as to open or close the cutout 848. In operation, the lid 820 is moved to the open position and one or more cables are connected to the receptacles within the in-floor box. The door 828 is moved slidingly inward under an upper surface 834 of the lid 820 to open the cutout 848. Accordingly, when the lid 820 is returned to the closed position, the door 828 does not protrude above the floor. However, the cutout 848 permits egress of the cables through the lid 820.

Figure 9:
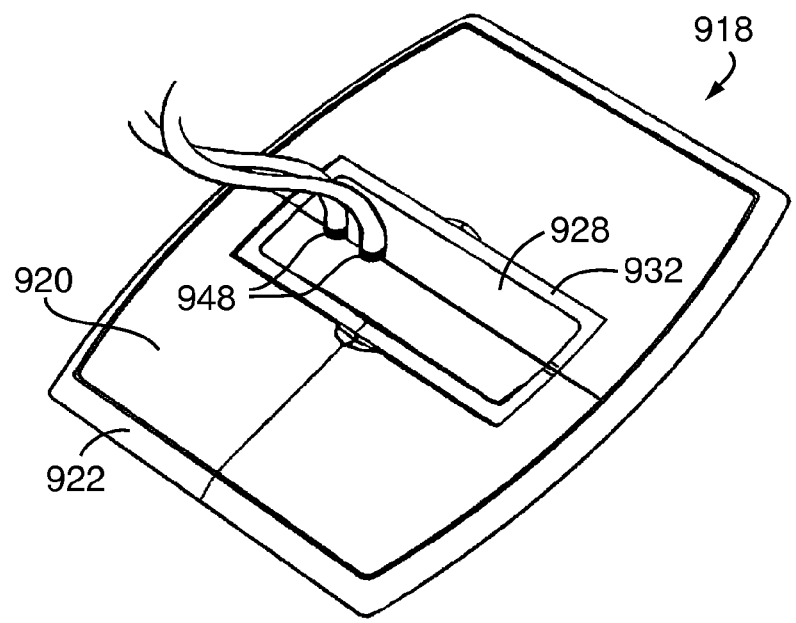
FIG. 9 is a perspective view of a cover assembly having a flexible door, according to yet another embodiment of the present invention.

In the embodiment shown in FIG. 9, a cover assembly 918 for an in-floor box includes clamshells 920 and a flange 922. Each clamshell 920 is pivotally connected to the flange 922 for motion between a closed position and an open position permitting access to receptacles housed within the in-floor box. Each clamshell 920 includes a flexible door 928. A handle 932 for moving the clamshell 920 is disposed adjacent to the flexible door 928. In operation, the handle 932 is raised away from the clamshell 920 and is used to open the clamshell 920. One or more cables are connected to one or more receptacles within the in-floor box, and the clamshell 920 is closed. The flexible door 928 deforms around each cable, thereby forming an egress 948 corresponding to each cable or group of cables.

One advantage of the present invention is that by permitting passage of cables into an in-floor box via a cutout of minimal size, the lid and door mitigate a risk of electrical damage caused by spilled drinks or foodstuffs.

Another advantage of the present invention is that by permitting passage of cables into an in-floor box via a cutout of minimal size, the lid and door mitigate a risk of injury from falling into, or tripping over, uncovered in-floor boxes.

Another advantage of the present invention is that by surrounding and holding cables plugged into the receptacles of the in-floor box, the lid and door of the present invention mitigate a problem of cables being yanked inadvertently from the in-floor box by clumsy pedestrians.

Yet another advantage of the present invention is that by being opened to a position generally flush with or below an upper surface of the lid, the door of the present invention presents a reduced tripping hazard while being opened to permit egress of cables from an in-floor box.

Although this invention has been shown and described with respect to the detailed embodiments thereof, it will be understood by those skilled in the art that various changes in form and detail thereof may be made without departing from the spirit and the scope of the invention.

What is claimed is:

1. A cover for an in-floor box housing receptacles, the cover comprising:
    a lid movable relative to said box between a closed position substantially covering said enclosure and an open position permitting insertion of a connector into one of said receptacles, the lid having a cutout formed therein for passage of a conduit attached to the connector;
    a door movable relative to said lid to open or close said cutout, the door being disposed generally below an upward surface of said lid in said closed position, when said cutout is opened and when said cutout is closed, wherein said door is slidingly movable relative to said lid;
    wherein said lid has a track, and said door includes a key slidingly engaged in the track;
    a securing bar fastened to said inner face of said lid, wherein said door is slidingly engaged between said securing bar and said inner face;
    a spring connected between said door and said lid, wherein the spring biases said door to close said cutout, wherein said securing bar includes a groove, said door includes a spring groove, and the spring is housed between the groove and the spring groove.

2. The cover according to claim 1, wherein said cutout is formed at a periphery of said lid.

3. The cover according to claim 1, wherein said door remains substantially below said upward surface of said lid while being moved to open and close said cutout.

4. The cover according to claim 1, further comprising a spring connected between said door and said lid, wherein the spring biases said door to close said cutout.

5. The cover according to claim 1, wherein said track is formed in an inner face of said lid.

6. The cover according to claim 1, wherein said groove includes a notch and said door includes a tab, the tab latching into the notch when said door is fully opened.

7. The cover according to claim 6, further comprising a flange for attaching said cover to an upper edge of said in-floor box, said door including a lifting surface and the flange including a ramp, wherein when said door is closed against the flange, the ramp contacts the lifting surface to disengage said tab from said notch, permitting said spring to move said door to close said cutout.

8. The cover according to claim 1, wherein said securing bar acts as a drip edge adjacent to said cutout.

9. The cover according to claim 1, further comprising a flange for attaching said cover to an upper edge of said in-floor box, wherein said lid is pivotally connected to said flange.

10. The cover according to claim 1, wherein said door is pivotally movable relative to said lid.

11. The cover according to claim 10, wherein said lid has an upper surface and has a recess indented into the upper surface, and said door nests into the recess when said door is moved to open said cutout.

12. The cover according to claim 1, wherein said door is elastically deformable relative to said lid for passage of said conduit.

13. The cover according to claim 12, further comprising a handle housed in said lid for lifting said lid away from said in-floor box, wherein the handle is disposed generally below an upward surface of said lid when said lid is in said closed position.

14. The cover according to claim 1, further comprising a handle for lifting said lid, wherein the handle is disposed generally below an upward surface of said lid when said lid is in said closed position.

15. An in-floor box for housing receptacles, the box comprising:
- a lid pivotally movable relative to said box between a closed position substantially covering said box and an open position permitting insertion of a connector into one of said receptacles, the lid having a cutout formed therein;
- a door movable relative to said lid to open or close said cutout, the door being disposed substantially below an upward surface of the lid in the closed position, when the cutout is opened and when the cutout is closed, wherein said door is slidingly movable relative to said lid;
- wherein said lid has a track, and said door includes a key slidingly engaged in the track;
- a securing bar fastened to said inner face of said lid, wherein said door is slidingly engaged between said securing bar and said inner face;
- a spring connected between said door and said lid, wherein the spring biases said door to close said cutout, wherein said securing bar includes a groove, said door includes a spring groove, and the spring is housed between the groove and the spring groove.

16. A cover for an in-floor box housing receptacles, the cover comprising:
- a lid movable relative to said box between a closed position substantially covering said enclosure and an open position permitting insertion of a connector into one of said receptacles, the lid having a cutout formed therein for passage of a conduit attached to the connector;
- a door movable relative to said lid to open or close said cutout, the door being disposed generally below an upward surface of said lid in said closed position, when said cutout is opened and when said cutout is closed, wherein said door is slidingly movable relative to said lid;
- wherein said lid has a track, and said door includes a key slidingly engaged in the track; and
- a securing bar fastened to said inner face of said lid, wherein said door is slidingly engaged between said securing bar and said inner face;
- wherein said securing bar acts as a drip edge adjacent to said cutout.

17. An in-floor box for housing receptacles, the box comprising:
- a lid pivotally movable relative to said box between a closed position substantially covering said box and an open position permitting insertion of a connector into one of said receptacles, the lid having a cutout formed therein;
- a door movable relative to said lid to open or close said cutout, the door being disposed substantially below an upward surface of the lid in the closed position, when the cutout is opened and when the cutout is closed, wherein said door is slidingly movable relative to said lid;
- wherein said lid has a track, and said door includes a key slidingly engaged in the track; and
- a securing bar fastened to said inner face of said lid, wherein said door is slidingly engaged between said securing bar and said inner face;
- wherein said securing bar acts as a drip edge adjacent to said cutout.

* * * * *